US009234263B2

(12) United States Patent
Kuroda et al.

(10) Patent No.: US 9,234,263 B2
(45) Date of Patent: *Jan. 12, 2016

(54) WELDMENT

(75) Inventors: Hiromitsu Kuroda, Hitachi (JP); Toru Sumi, Hitachi (JP); Hideyuki Sagawa, Tokai-mura (JP); Seigi Aoyama, Kitaibaraki (JP); Masayoshi Goto, Hitachi (JP); Takahiko Hanada, Hiki-gun (JP); Takahiro Sato, Hitachi (JP); Hidenori Abe, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 13/317,463

(22) Filed: Oct. 19, 2011

(65) Prior Publication Data

US 2012/0100390 A1 Apr. 26, 2012

(30) Foreign Application Priority Data

Oct. 20, 2010 (JP) ................................. 2010-235267

(51) Int. Cl.
*B32B 15/20* (2006.01)
*C22C 9/00* (2006.01)
(Continued)

(52) U.S. Cl.
CPC . *C22C 9/00* (2013.01); *B23K 31/00* (2013.01); *B32B 15/20* (2013.01); *C22C 1/02* (2013.01);
(Continued)

(58) Field of Classification Search
CPC .............. C22C 1/02; C22C 1/03; C22C 9/00; C22C 29/12; C22C 30/00; C22C 30/005; C22C 1/1036; B32B 15/015; B32B 15/04; B32B 15/043; B32B 15/20; Y10T 428/12667; Y10T 428/1266; Y10T 428/12882; Y10T 428/12903; Y10T 428/1291
USPC .......... 428/674, 675, 676, 671, 677, 640, 639
See application file for complete search history.

(56) References Cited

U.S. PATENT DOCUMENTS 3,143,789 A 8/1964 Iler et al.
5,077,005 A 12/1991 Kato
(Continued)

FOREIGN PATENT DOCUMENTS

CN 1384216 A 12/2002
JP 1-264110 A 10/1989
(Continued)

OTHER PUBLICATIONS

"Iron and Copper" by Hisashi Suzuki and Mikihiro Sugano (1984), The Iron and Steel Institute of Japan (ISIJ), No. 15, 1977-1983), with partial English translation.
(Continued)

*Primary Examiner* — Michael E La Villa
(74) *Attorney, Agent, or Firm* — McGinn IP Law Group, PLLC

(57) ABSTRACT

A weldment includes metal materials that are welded to each other. At least one of the metal materials includes pure copper including an inevitable impurity, more than 2 mass ppm of oxygen, and an additive element selected from the group consisting of Mg, Zr, Nb, Fe, Si, Al, Ca, V, Ni, Mn, Ti and Cr. A method of manufacturing a weldment includes melting a dilute copper alloy material by SCR continuous casting and rolling at a molten copper temperature of not less than 1100° C. and not more than 1320° C. to make a molten metal, forming a cast bar from the molten metal, forming a dilute copper alloy member by hot-rolling the cast bar, and welding the dilute copper alloy member to a metal material. The dilute copper alloy material includes the pure copper, more than 2 mass ppm of oxygen, and the additive element,?

3 Claims, 13 Drawing Sheets

(51) Int. Cl.
*B23K 31/00* (2006.01)
*C22C 1/02* (2006.01)
*C22C 1/10* (2006.01)
*C22F 1/00* (2006.01)
*C22F 1/08* (2006.01)

(52) U.S. Cl.
CPC .............. *C22C 1/1036* (2013.01); *C22F 1/00* (2013.01); *C22F 1/08* (2013.01); *Y10T 428/1266* (2015.01); *Y10T 428/1291* (2015.01); *Y10T 428/12667* (2015.01); *Y10T 428/12882* (2015.01); *Y10T 428/12903* (2015.01)

(56) References Cited

U.S. PATENT DOCUMENTS

| | | |
|---|---|---|
| 2001/0028135 A1 | 10/2001 | Asao et al. |
| 2001/0029659 A1 | 10/2001 | Asao et al. |
| 2002/0157741 A1 | 10/2002 | Yamamoto et al. |
| 2005/0262968 A1 | 12/2005 | Asao et al. |
| 2010/0263905 A1* | 10/2010 | Aoyama et al. ............... 174/107 |
| 2012/0097904 A1* | 4/2012 | Kuroda et al. ................ 252/513 |
| 2013/0022831 A1* | 1/2013 | Sagawa et al. ................ 428/606 |

FOREIGN PATENT DOCUMENTS

| | | |
|---|---|---|
| JP | 2-104629 A | 4/1990 |
| JP | 2-163330 A | 6/1990 |
| JP | 2737954 B2 | 4/1998 |
| JP | 2737965 B2 | 4/1998 |
| JP | 3050554 B2 | 6/2000 |
| JP | 2001-314950 A | 11/2001 |
| JP | 2002-120050 A | 4/2002 |
| JP | 3552043 B2 | 8/2004 |
| JP | 3651386 B2 | 5/2005 |
| JP | 2006-274383 A | 10/2006 |
| JP | 2006-274384 A | 10/2006 |
| JP | 2008-001933 A | 1/2008 |
| JP | 2008-084874 A | 4/2008 |
| JP | 2008-255417 A | 10/2008 |

OTHER PUBLICATIONS

US Office Action dated Oct. 8, 2013 in U.S. Appl. No. 13/317,461.
United States Office Action dated May 1, 2014 in U.S. Appl. No. 13/317,461.
Information Offer Form received on Feb. 12, 2014 (received by JPO on Jan. 16, 2014) from nameless third party with an English translation.
Japanese Office Action dated Feb. 25, 2014 with an Enligh translation.
Journal of the Japan Institute of Metals, vol. 52, No. 9 (1987), pp. 858-863 and a partial English translation.
United States Office Action dated Apr. 7, 2015 in the U.S. Appl. No. 13/553,762.
United States Office Action dated May 19, 2015 in the U.S. Appl. No. 13/317,461.
Chinese Office Action dated Jun. 3, 2015 with a partial English translation.
United States Office Action dated Sep. 25, 2015 in U.S. Appl. No. 13/553,762.
United States Office Action dated Nov. 5, 2015 in U.S. Appl. No. 13/317,461.

* cited by examiner

WELDMENT

The present application is based on Japanese Patent Application No. 2010-235267 filed on Oct. 20, 2010, the entire contents of which are incorporated herein by reference.

BACKGROUND OF THE INVENTION

1. Field of the Invention

The invention relates to a weldment (or welded assembly) and a method of manufacturing the weldment.

2. Description of the Related Art

In industrial products such as electronic devices and vehicles, a copper wire is sometimes used under a harsh condition. In order to provide a copper wire endurable under the harsh condition, a dilute copper alloy material which can be manufactured by a continuous casting and rolling method, etc., and has an improved strength greater than that of pure copper while maintaining conductivity and elongation characteristics to a pure copper level has been being developed.

A dilute copper alloy material is demanded to be a soft conductor having a conductivity of not less than 98%, preferably not less than 102% as a general purpose soft copper wire or a soft copper material to which the softness is required. The intended purpose of such a soft conductor includes a cabling material for commercial solar cell, an enameled wire conductor for motor, a high-temperature application soft copper material used at from 200 to 700° C., a molten solder plating material not requiring annealing, a copper material excellent in thermal conductivity and a material alternative to high purity copper.

A raw material as the dilute copper alloy material is manufactured by basically using a technique of controlling oxygen in copper to not more than 10 mass ppm. It is expected to obtain a dilute copper alloy material having high productivity and excellent in conductivity, softening temperature and surface quality by adding a small amount of metal such as Ti into the base raw material so as to form a solid solution.

Regarding conventional softening, the result has been obtained in which the softening of a sample in which 4 to 28 mol ppm of Ti is added to electrolyte copper (not less than 99.996 mass %) occurs earlier than a sample without addition thereof (see, e.g., "Iron and Copper" by Hisashi Suzuki and Mikihiro Sugano (1984), No. 15, 1977-1983). According to "Iron and Copper", a decrease of sulfur incorporated into a solid solution due to formation of Ti sulfide causes softening to occur in early stage.

Meanwhile, it has been proposed to continuously cast in a continuous casting apparatus using a dilute alloy in which a small amount of Ti is added to oxygen-free copper (see, e.g., JP patent Nos. 3050554, 2737954 and 2737965). Furthermore, a method of reducing oxygen concentration by a continuous casting and rolling method has been also proposed (see, e.g., JP patent Nos. 3552043 and 3651386). In addition, it has been proposed that, when a copper material is manufactured directly from molten metal of copper by the continuous casting and rolling method, the softening temperature is lowered by adding a small amount of metal such as Ti, Zr or V (0.0007 to 0.005 mass %) to the molten metal of copper with an oxygen amount of not more than 0.005 mass % (see, e.g., JP-A-2006-274384). In this regard, however, the conductivity is not examined in JP-A-2006-274384 and the manufacturing conditions for achieving both of the conductivity and the softening temperature are unknown.

On the other hand, a method of manufacturing an oxygen-free copper material having a low softening temperature and high conductivity has been proposed. That is, a method has been proposed in which a copper material is manufactured by a drawing-up continuous casting apparatus using molten metal of copper in which a small amount of metal such as Ti, Zr or V (0.0007 to 0.005 mass %) is added to the oxygen-free copper with an oxygen amount of 0.0001 mass % (see, e.g., JP-A-2008-255417).

Meanwhile, TIG (Tungsten Inert Gas) welding is a technique for fusion-welding a copper material. Only high purity copper and oxygen-free copper with a low oxygen concentration of less than 2 mass ppm are the materials which allow this welding method to be used.

SUMMARY OF THE INVENTION

However, a material including a trace amount of oxygen, i.e., a material with an oxygen concentration of ppm-order as is a base material of the dilute copper alloy material, is not examined in any of the above-mentioned documents. In general, oxygen present in copper is in the form of $Cu_2O$ and produces $H_2O$ by a reaction with hydrogen (H) in an arc atmosphere during TIG welding, and the produced $H_2O$ is trapped as a blow hole in copper.

In addition, high purity copper or oxygen-free copper with a low oxygen concentration is selected as a copper material used for the TIG welding, otherwise blow holes are generated due to oxygen in cuprous oxide ($Cu_2O$) included in the material when the copper is melted by heat of arc discharge from a tungsten electrode to an object to be welded and this may cause a decrease in weld strength of the material itself and hydrogen embrittlement, etc. However, high purity copper and oxygen-free copper are expensive, hence, the cost reduction of the copper material is desired.

In addition, as for the manufacturing method, there is a method of softening copper by adding Ti to oxygen-free copper by continuous casting, in which a wire rod is made by hot extrusion or hot rolling after manufacturing a casting material as cake or billet. Thus, the manufacturing cost is high and there is a problem of economic efficiency for industrial use.

In addition, although there is a method of adding Ti to oxygen-free copper in the drawing-up continuous casting apparatus, this method also has a problem of economic efficiency due to the slow production rate.

Then, a method using a SCR continuous casting and rolling system (South Continuous Rod System) is examined.

In the SCR continuous casting and rolling system, molten metal is formed by melting a base material in a melting furnace of the SCR continuous casting and rolling apparatus, a desired metal is added and melted in the molten metal, a cast bar (e.g., 8 mm in diameter) is made of the molten metal and the cast bar is drawn to be, e.g., 2.6 mm in diameter by hot rolling. It is also possible to be processed into a wire of not more than 2.6 mm in diameter, or a plate material or a deformed material in the same way. In addition, it is effective to roll a round wire rod into a rectangular or contour strip. Alternatively, it is possible to make a deformed material by conform extrusion of casting material.

As a result of the examination by inventors, etc., it is found that a surface flaw is likely to be generated in tough pitch copper as a base material when the SCR continuous casting and rolling is used, and variation of softening temperature and a status of titanium oxide formation are unstable depending on conditions for addition.

In addition, when examined using oxygen-free copper of not more than 0.0001 mass %, the conditions which satisfy the softening temperature, the conductivity and the surface quality are in a very narrow range. Furthermore, there is a limit to decrease the softening temperature, thus, the further lower softening temperature which is equivalent to that of high purity copper is desired.

Accordingly, it is an object of the invention to provide a weldment that has high productivity and is excellent in conductivity, softening temperature and surface quality, as well as a method of manufacturing the weldment. Another object of the invention is to provide a weldment that no blow holes due to steam is generated during fusion welding even if the amount of oxygen included in a copper alloy is greater than that in oxygen-free copper, as well as a method of manufacturing the weldment.

(1) According to one embodiment of the invention, a weldment comprises:

metal materials that are welded to each other,
wherein at least one of the metal materials comprises:
    pure copper comprising an inevitable impurity;
    more than 2 mass ppm of oxygen; and
    an additive element selected from the group consisting of Mg, Zr, Nb, Fe, Si, Al, Ca, V, Ni, Mn, Ti and Cr.

In the above embodiment (1) of the invention, the following modifications and changes can be made.

(i) The additive element comprises Ti, and the Ti added amounts not less than 4 mass ppm and not more than 55 mass ppm.

(ii) The Ti in the form of any one of TiO, $TiO_2$, TiS or Ti—O—S is included in a crystal grain or at crystal grain boundary of the pure copper.

(2) According to another embodiment of the invention, a method of manufacturing a weldment comprises:

melting a dilute copper alloy material by SCR continuous casting and rolling at a molten copper temperature of not less than 1100° C. and not more than 1320° C. to make a molten metal, the dilute copper alloy material comprising pure copper comprising an inevitable impurity, more than 2 mass ppm of oxygen, and an additive element selected from the group consisting of Mg, Zr, Nb, Ca, V, Fe, Si, Al, Ni, Mn, Ti and Cr,
    forming a cast bar from the molten metal;
    forming a dilute copper alloy member by hot-rolling the cast bar; and
    welding the dilute copper alloy member to a metal material.

In the above embodiment (2) of the invention, the following modifications and changes can be made.

(iii) The hot rolling of the cast bar is performed at a temperature of not more than 880° C. at an initial roll and not less than 550° C. at a final roll.

Effects of the Invention

According to one embodiment of the invention, a weldment can be provided that has high productivity and is excellent in conductivity, softening temperature and surface quality, as well as a method of manufacturing the weldment. According to another embodiment of the invention, a weldment can be provided that no blow holes due to steam is generated during fusion welding even if the amount of oxygen included in a copper alloy is greater than that in oxygen-free copper, as well as a method of manufacturing the weldment.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

Figure 1:
FIG. 1 is an SEM image of TiS particle.

A dilute copper alloy material in the present embodiment is formed using a soft dilute copper alloy material as a soft copper material which satisfies a conductivity of not less than 98% IACS (International Annealed Copper Standard, conductivity is defined as 100% when resistivity is $1.7241 \times 10^{-8}$ Ωm), preferably not less than 100% IACS, and more preferably not less than 102% IACS.

In addition, the dilute copper alloy material in the present embodiment can be stably produced in a wide range of manufacturing with less generation of surface flaws by a SCR continuous casting equipment. In addition, a material having a softening temperature of not more than 148° C. when a working ratio of a wire rod is 90% (e.g., processing from an 8 mm diameter wire into a 2.6 mm diameter wire) is used.

In detail, a weldment in the present embodiment formed by welding metal materials to each other is excellent in weldability and is formed of pure copper with inevitable impurities in which more than 2 mass ppm of oxygen and an additive element selected from the group consisting of Mg, Zr, Nb, Ca, V, Fe, Si, Al, Ni, Mn, Ti and Cr are included. One or more additive elements should be contained. The reason why element(s) selected from the group consisting of Ti, Mg, Zr, Nb, Ca, V, Ni, Mn, Al, Fe, Si and Cr is selected as an additive element is that an oxide thereof is more likely to be formed than that of Cu and the oxide which is thermologically more stable than steam to be a cause of generating blow holes is not decomposed even in the presence of hydrogen (steam is not produced), hence, blow holes are not generated. Alternatively, other elements or impurities which do not adversely affect the properties of an alloy may be contained in the alloy. In addition, although it is explained in the preferred embodiment below that the favorable oxygen content is more than 2 but not more than 30 mass ppm, oxygen can be included in an amount of more than 2 but not more than 400 mass ppm within a range providing the properties of the alloy, depending on the added amount of the additive element and the S content.

Meanwhile, the Ti is included in the form of any one of TiO, $TiO_2$, TiS or Ti—O—S and is precipitated in a crystal grain or at crystal grain boundary of pure copper. Mg in the form of any one of MgO, $MgO_2$, MgS or Mg—O—S, Zr in the form of any one of $ZrO_2$, ZrS or Zr—O—S, Nb in the form of any one of NbO, $NbO_2$, NbS or Nb—O—S, Ca in the form of any one of CaO, CaO$_2$, CaS or Ca—O—S, V in the form of any one of V$_2$O$_3$, V$_2$O$_5$, SV or V—O—S, Ni in the form of any one of NiO$_2$, Ni$_2$O$_3$, NiS or Ni—O—S, Mn in the form of any one of MnO, Mn$_3$O$_4$, MnS or Mn—O—S, and Cr in the form of any one of Cr$_3$O$_4$, Cr$_2$O$_3$, CrO$_2$, CrS or Cr—O—S are contained and precipitated in a crystal grain or at crystal grain boundary of pure copper.

Meanwhile, the weldment in the present embodiment is manufactured as follows. That is, a dilute copper alloy material formed of pure copper with inevitable impurities, in which more than 2 mass ppm of oxygen and an additive element selected from the group consisting of Mg, Zr, Nb, Ca, V, Fe, Si, Al, Ni, Mn, Ti and Cr are included, is firstly prepared. Next, molten metal is formed from the dilute copper alloy material by SCR continuous casting and rolling at a molten copper temperature of not less than 1100° C. and not more than 1320° C. Then, a cast bar is made from the molten metal. Following this, a dilute copper alloy member is made by hot-rolling the cast bar. Then, the dilute copper alloy member is welded to a metal material. A weldment in the present embodiment is thereby manufactured.

The hot rolling process is performed at a temperature of not more than 880° C. at the initial roll and not less than 550° C. at the final roll.

In addition, a weldment in another embodiment is formed by welding metal materials to each other. In addition, at least one of the metal materials contains pure copper with inevitable impurities including more than 2 mass ppm of oxygen and an additive element selected from the group consisting of Mg, Zr, Nb, Ca, V, Ni, Mn, Ti, Fe, Si, Al and Cr. Here, Ti is included in the form of any one of TiO, TiO$_2$, TiS or Ti—O—S in a crystal grain or at crystal grain boundary of pure copper.

The points studied by the inventors to realize a dilute copper alloy material in the present embodiment will be explained below.

The softening temperature at the working ratio of 90% is 130° C. for high purity copper (Cu) with a purity of 6N (i.e., 99.9999%). Therefore, the inventors examined a soft dilute copper alloy material which allows stable manufacturing of soft copper having a softening temperature of not less than 130° C. and not more than 148° C. as a temperature allowing stable manufacturing and a conductivity of not less than 98% IACS, preferably not less than 100% IACS, and more preferably not less than 102% IACS, and a method of manufacturing the soft dilute copper alloy material.

Here, high purity copper (4N) with an oxygen concentration of 1 to 2 mass ppm is prepared and molten metal of Cu is made therefrom by using a small continuous casting machine placed in an experimental laboratory. Then, several mass ppm of titanium is added to the molten metal. Following this, a cast bar (e.g., an 8 mm diameter wire rod) is formed from the molten metal having titanium added thereto. Next, the 8 mm diameter wire rod is processed to have 2.6 mm diameter (i.e., at a working ratio of 90%). The softening temperature of the 2.6 mm diameter wire rod is 160 to 168° C. and cannot be lower than this temperature. In addition, the conductivity of the 2.6 mm diameter wire rod is about 101.7% IACS. That is, the inventors found that, even though the oxygen concentration in the wire rod is reduced and titanium is added to the molten metal, it is not possible to lower the softening temperature of the wire rod and the conductivity is lower than that of high purity copper (6N) which is 102.8% IACS.

It is presumed that the softening temperature is not lowered and the conductivity is lower than that of 6N high purity copper because several mass ppm or more of sulfur (S) is mixed as inevitable impurity during manufacturing of the molten metal. That is, it is presumed that the softening temperature of the wire rod is not lowered since sulfide such as TiS, etc., is not sufficiently formed by sulfur and titanium which are included in the molten metal.

Accordingly, the inventors examined following two measures in order to lower the softening temperature of the dilute copper alloy material and to improve the conductivity thereof. Then, the dilute copper alloy material in the present embodiment is obtained by combining the following two measures to manufacture a wire rod.

Figure 2:
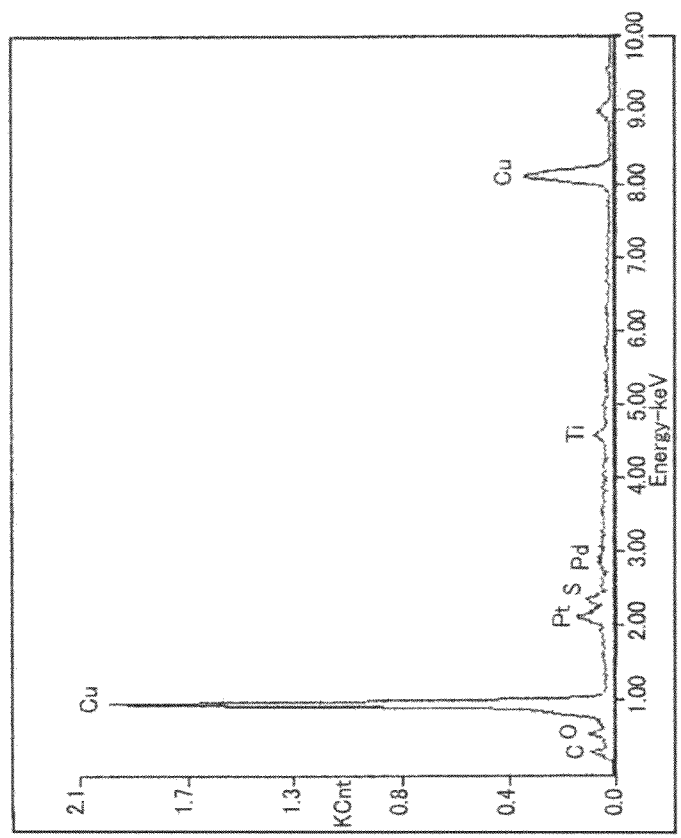
FIG. 2 is a graph showing a result of analysis of FIG. 1.
Figure 3:
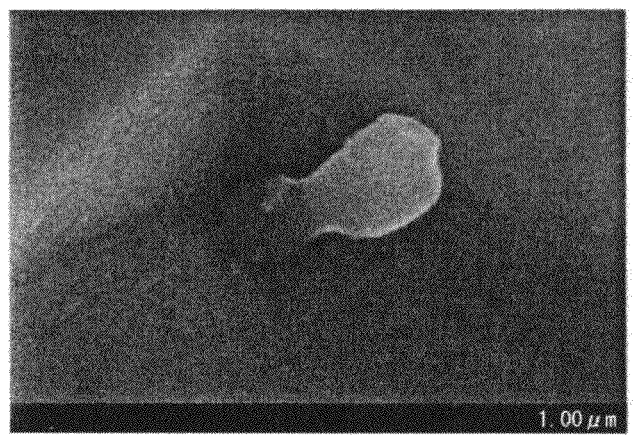
FIG. 3 is an SEM image of $TiO_2$ particle.
Figure 4:
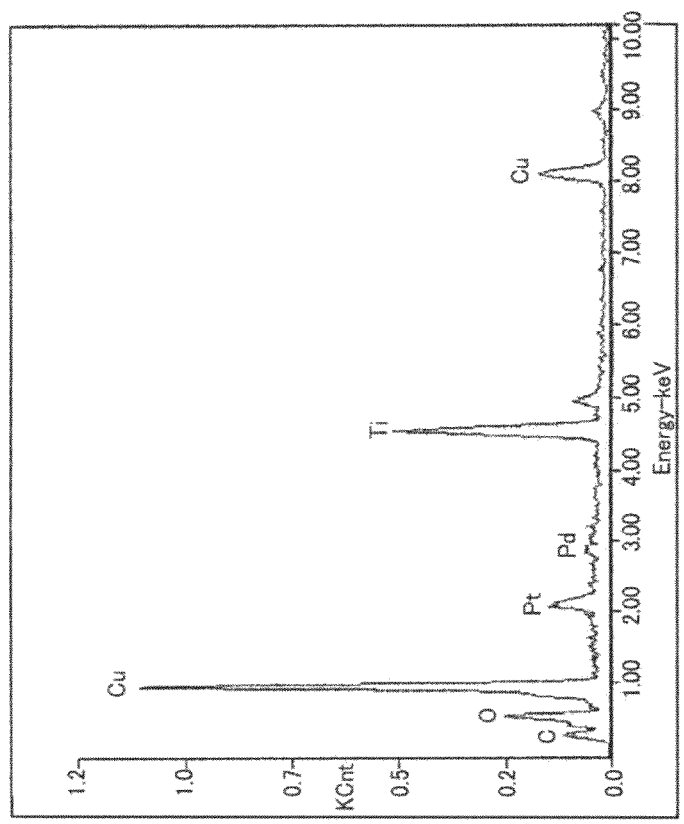
FIG. 4 is a graph showing a result of analysis of FIG. 3.
Figure 5:
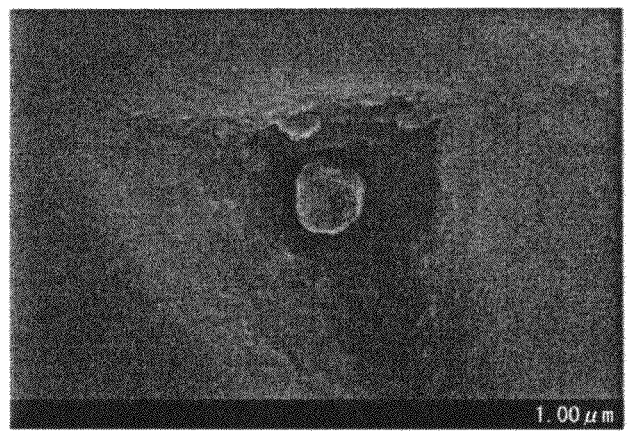
FIG. 5 is an SEM image of Ti—O—S particle.
Figure 6:
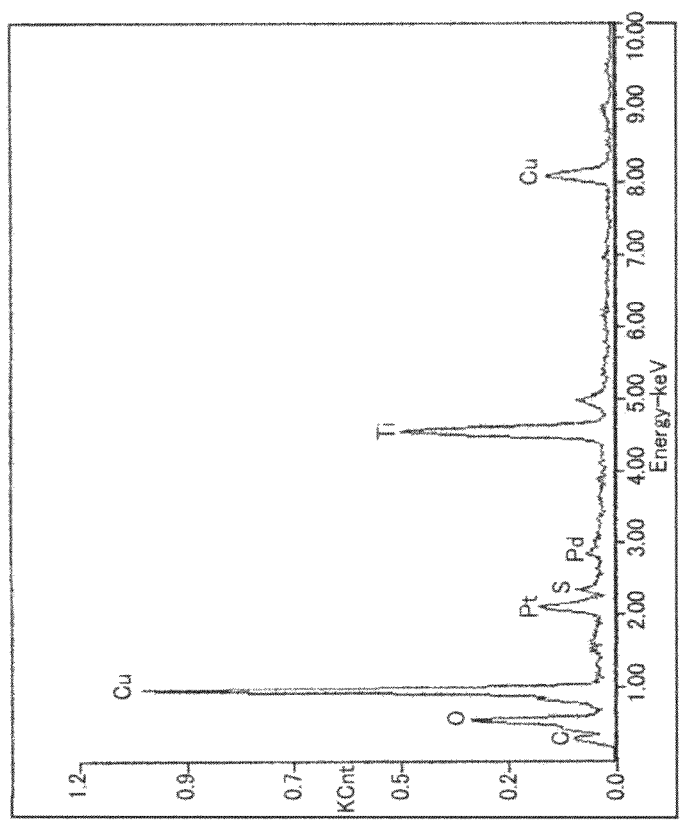
FIG. 6 is a graph showing a result of analysis of FIG. 5.
Figure 7:
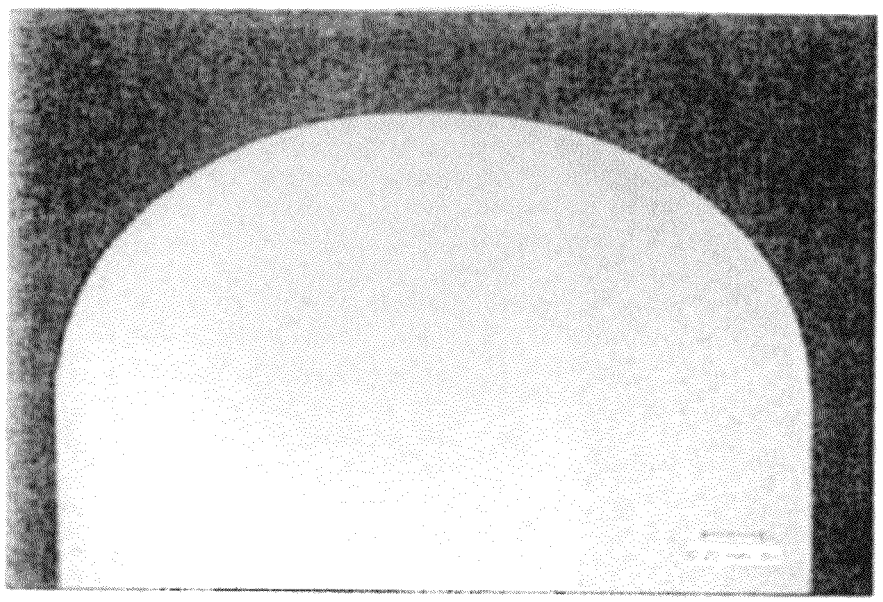
FIG. 7 is a cross sectional view showing a TIG welded joint in Example.
Figure 8:
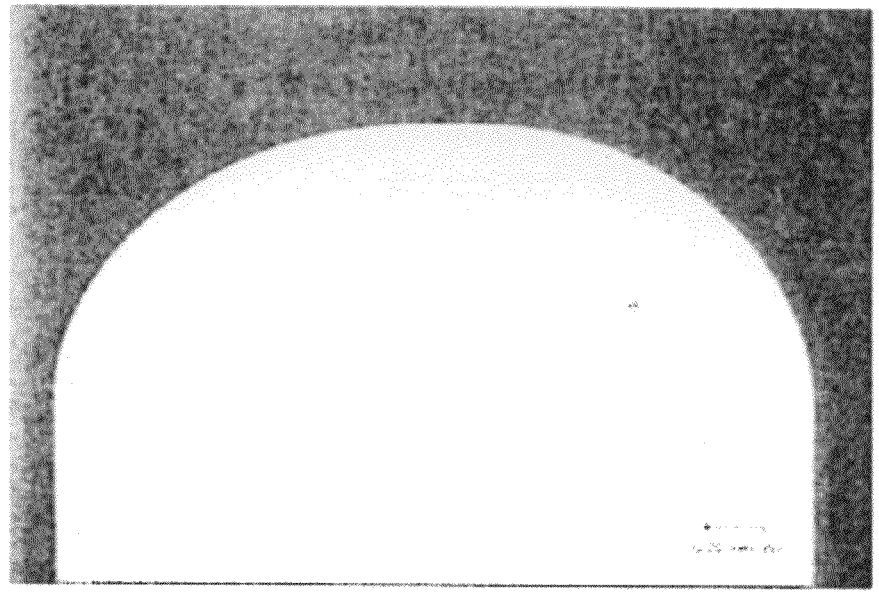
FIG. 8 is a cross sectional view showing a TIG welded joint of oxygen-free copper (OFC)
Figure 9:
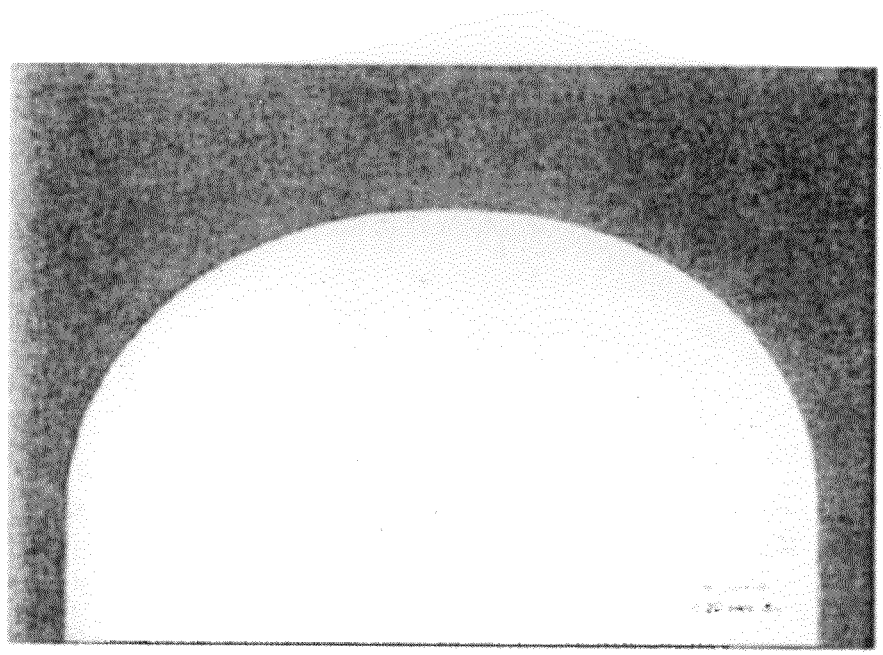
FIG. 9 is a cross sectional view showing a TIG welded joint of high purity copper (6N copper: Cu 99.9999%)
Figure 10:
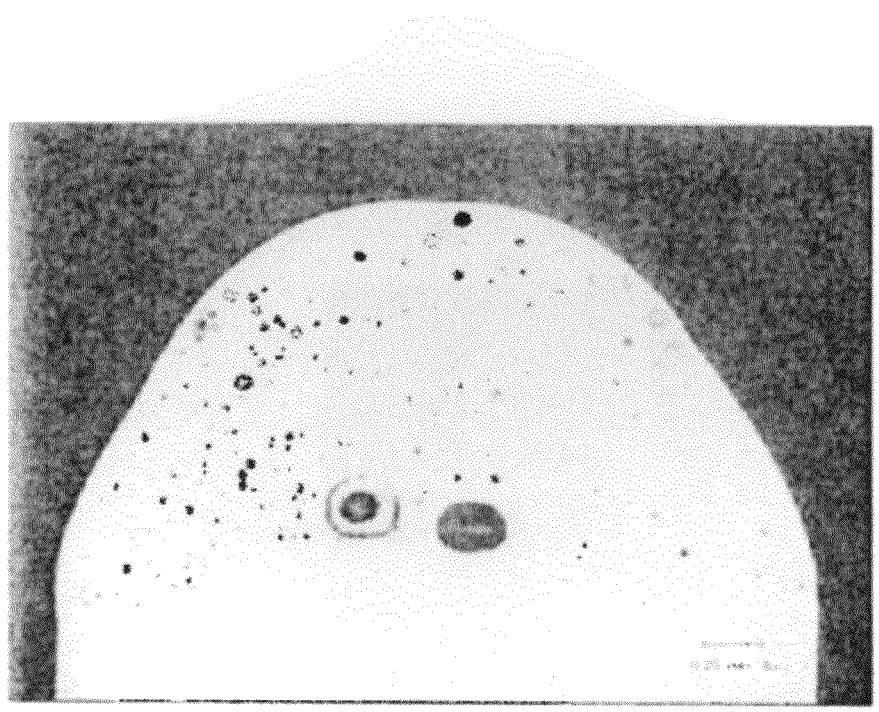
FIG. 10 is a cross sectional view showing a TIG welded joint of tough pitch copper (TPC)

FIG. 1 is an SEM image of TiS particle and FIG. 2 shows a result of analysis of FIG. 1. Then, FIG. 3 is an SEM image of TiO$_2$ particle and FIG. 4 shows a result of analysis of FIG. 3. Furthermore, FIG. 5 is an SEM image of Ti—O—S particle and FIG. 6 shows a result of analysis of FIG. 5. Note that, each particle is seen near the center of the SEM image.

Firstly, as the first measure, molten metal of copper is made in a state that titanium (Ti) is added to Cu having an oxygen concentration of more than 2 mass ppm. It is considered that TiS, titanium oxide (e.g., TiO$_2$) and Ti—O—S particles are formed in molten metal. This is observed in the SEM image of FIG. 1, the result of analysis in FIG. 2, the SEM image of FIG. 3 and the result of analysis in FIG. 4. It should be noted that Pt and Pd in FIGS. 2, 4 and 6 are metal elements deposited on an object to be observed under the SEM observation. In FIGS. 1 to 6, a cross section of an 8 mm diameter copper wire (wire rod) having an oxygen concentration, a Ti concentration and a sulfur concentration which are shown in the third row of Example 1 in Table 1 is evaluated by an SEM observation and an EDX analysis. The observation conditions are an acceleration voltage of 15 keV and an emission current of 10 µA.

Next, as the second measure, a temperature during the hot rolling process is set to be lower (880 to 550° C.) than the temperature under the typical manufacturing conditions of copper (i.e., 950 to 600° C.) for the purpose that dislocation is introduced into copper for easy precipitation of sulfur (S). Such a temperature setting allows S to be precipitated on the dislocation or to be precipitated using titanium oxide (e.g., TiO$_2$) as a nucleus. For example, Ti—O—S particles, etc., are formed at the same time as the formation of the molten copper, as shown in FIGS. 5 and 6.

Since the sulfur included in the copper is crystallized and precipitated by the first and second measures described above, a copper wire rod which has the desired softening temperature and the desired conductivity can be obtained after a cold wire drawing process.

Meanwhile, the dilute copper alloy material in the present embodiment is manufactured using a SCR continuous casting and rolling equipment. Here, the following three conditions are set as a limitation of the manufacturing conditions in case of using the SCR continuous casting and rolling equipment.

(1) Composition

In order to obtain a soft copper material having a conductivity of not less than 98% IACS, a soft dilute copper alloy material using pure copper with inevitable impurities (as a base material) and including 3 to 12 mass ppm of sulfur, more than 2 but not more than 30 mass ppm of oxygen and 4 to 55 mass ppm of titanium is used, and then, a wire rod (a roughly drawn wire) is manufactured using the soft dilute copper alloy material. The object used in the present embodiment includes more than 2 mass ppm but not more than 30 mass ppm of oxygen, hence, is so-called low-oxygen copper (LOC).

Here, in order to obtain a soft copper material having a conductivity of not less than 100% IACS, a soft dilute copper alloy material using pure copper with inevitable impurities (as a base material) and including 2 to 12 mass ppm of sulfur, more than 2 but not more than 30 mass ppm of oxygen and 4 to 37 mass ppm of titanium is used. In addition, in order to obtain a soft copper material having a conductivity of not less than 102% IACS, a soft dilute copper alloy material using pure copper with inevitable impurities (as a base material) and including 3 to 12 mass ppm of sulfur, more than 2 but not more than 30 mass ppm of oxygen and 4 to 25 mass ppm of titanium is used.

In the industrial production of pure copper, sulfur is generally introduced into copper during the manufacturing of electrolytic copper, and it is thus difficult to adjust sulfur to not more than 3 mass ppm. The upper limit of the sulfur concentration for general-purpose electrolytic copper is 12 mass ppm.

An oxygen concentration is controlled to more than 2 mass ppm since the softening temperature of the dilute copper alloy material is less likely to decrease when the oxygen concentration is low. On the other hand, since flaws are likely to be generated on the surface of the dilute copper alloy material during the hot rolling process when oxygen concentration is high, the oxygen concentration is controlled to not more than 30 mass ppm. In addition, when the Ti content in the metal material is X (weight %) and the oxygen content therein is Y (weight %), the value of X/Y is desirably not less than 0.5 but less than 7. This is because copper oxide or cuprous oxide formed by binding of Cu with excess oxygen not used to form a compound with Ti causes generation of blow holes when the value of X/Y is less than 5, and Ti not used to form a compound with oxygen is incorporated (as a solid solution) into the copper and the conductivity decreases when X/Y is more than 7 by contraries.

(2) Dispersed Substance

It is preferable that the dispersed particle in the dilute copper alloy material be small in size and that a large number of dispersed particles be dispersed in the dilute copper alloy material. The reason thereof is that the dispersed particle has a function as a precipitation site of sulfur and the precipitation site is required to be small in size and large in number.

Sulfur and titanium are included in the dilute copper alloy material in the form of TiO, $TiO_2$, TiS or a compound having a Ti—O—S bond, or aggregates thereof, and the rest of Ti and S are included as a solid solution. A soft dilute copper alloy material as a raw material of the dilute copper alloy material, in which TiO of not more than 200 nm in size, $TiO_2$ of not more than 1000 nm in size, TiS of not more than 200 nm in size and the compound in the form of Ti—O—S of not more than 300 nm in size are distributed in a crystal grain, is used. Here, "a crystal grain" means a crystalline structure of copper.

Note that, since the size of particle formed in the crystal grain varies depending on holding time or a cooling condition of the molten copper during the casting, the casting conditions are also appropriately determined.

(3) Casting Conditions

A cast bar (e.g., a wire rod) is made by the SCR continuous casting and rolling, where a working ratio for processing an ingot rod is 90% (30 mm) to 99.8% (5 mm). As an example, a condition to manufacture an 8 mm diameter wire rod at a working ratio of 99.3% is employed. The casting conditions (a) and (b) will be explained below.

Casting Condition (a)

The molten copper temperature in the melting furnace is controlled to not less than 1100° C. and not more than 1320° C. It is controlled to not more than 1320° C. since there is a tendency that a blow hole is increased, a flaw is generated and a particle size is enlarged when the temperature of the molten copper is high. Although the reason for controlling the temperature to not less than 1100° C. is that copper is likely to solidify and the manufacturing is not stable, the molten copper temperature is desirably as low as possible.

Casting Condition (b)

The temperature during the hot rolling process is controlled to not more than 880° C. at the initial roll and not less than 550° C. at the final roll.

Unlike the typical manufacturing conditions of pure copper, it is preferable to determine the temperature of the molten copper and the temperature during the hot rolling process to the conditions described in "the casting conditions (a) and (b)" in order to further decrease a solid solubility limit which is a driving force to crystallize sulfur in the molten copper and to precipitate the sulfur during the hot rolling.

In addition, the typical temperature during the hot rolling process is not more than 950° C. at the initial roll and not less than 600° C. at the final roll, however, in order to further decrease the solid solubility limit, the temperature in the present embodiment is determined to not more than 880° C. at the initial roll and not less than 550° C. at the final roll.

The reason why the temperature at the final roll is determined to not less than 550° C. is that there are many flaws on the obtained wire rod at a temperature of less than 550° C. and the manufactured dilute copper alloy material cannot be treated as a commercial product. The temperature during the hot rolling process is controlled to not more than 880° C. at the initial roll and not less than 550° C. at the final roll, and is preferably as low temperature as possible. Such a temperature setting allows the softening temperature of the dilute copper alloy material (the softening temperature after being processed from 8 into 2.6 mm diameter) to be close to that of 6N high purity copper (i.e., 130° C.).

The conductivity of oxygen-free copper is about 101.7% IACS and that of 6N copper is 102.8% IACS. In the present embodiment, a wire rod with a diameter of 8 mm has a conductivity of not less than 98% IACS, preferably not less than 100% IACS, and more preferably not less than 102% IACS. In addition, in the present embodiment, a soft dilute copper alloy is manufactured such that a wire rod as a wire material after the cold wire drawing process (e.g., 2.6 mm diameter) has a softening temperature of not less than 130° C. and not more than 148° C., and the soft dilute copper alloy is used to manufacture a dilute copper alloy material.

For the industrial use, a conductivity of not less than 98% IACS is required for the soft copper wire manufactured from electrolyte copper with industrially usable purity. In addition, the softening temperature should be not more than 148° C. in light of the industrial value thereof. Since the softening temperature of 6N copper is 127 to 130° C., the upper limit of the softening temperature is determined to 130° C. based on the obtained data. This slight difference is caused by a presence of inevitable impurity which is not included in 6N copper.

It is preferable that the copper as a base material be molten in a shaft furnace and be subsequently poured into a ladle in a reduced-state. That is, it is preferable that a wire rod be stably manufactured by casting and rolling the material in a reduction system such as a reductive gas (e.g., CO) atmosphere shield while controlling concentrations of sulfur, titanium and oxygen of a dilute alloy. Note that, mixture of copper oxide and/or a particle size larger than a predetermined size cause deterioration in the quality of the dilute copper alloy material to be manufactured.

Here, the reason why titanium is added as an additive to the dilute copper alloy material is as follows. That is, (a) titanium is likely to form a compound by binding to sulfur in the molten copper, (b) it is easy to process and handle compared to other added metals such as Zr, (c) it is cheaper than Nb, etc., and (d) it is likely to be precipitated using oxide as a nucleus.

As described above, a practical soft dilute copper alloy material having high productivity and excellent in conductivity, softening temperature and surface quality, which can be used for a molten solder plating material (wire, plate, foil), an enameled wire, soft pure copper, high conductivity copper and a soft copper wire and can reduce annealing energy, can be obtained as a raw material of the dilute copper alloy material in the present embodiment. In addition, a plating layer may be formed on a surface of the soft dilute copper alloy material. For example, a material consisting mainly of, e.g., tin, nickel and silver, or Pb-free plating can be used for the plating layer.

In addition, it is possible to use a soft dilute copper alloy twisted wire which is formed by twisting plural soft dilute copper alloy wires in the present embodiment. Furthermore, it is possible to use as a cable having an insulating layer which is provided on a periphery of the soft dilute copper alloy wire or the soft dilute copper alloy twisted wire. Also, it is possible to form a coaxial cable in which a central conductor is formed by twisting the plural soft dilute copper alloy wires, an insulating coating layer is formed on an outer periphery of the central conductor, an outer conductor formed of copper or copper alloy is arranged on an outer periphery of the insulating coating layer and a jacket layer is provided on an outer periphery of the outer conductor. In addition, it is possible to form a composite cable in which plural coaxial cables are arranged in a shield layer and a sheath is provided on an outer periphery of the shield layer.

In the present embodiment, a wire rod is formed by the SCR continuous casting and rolling method and a soft material is formed by the hot rolling. However, it is possible to use a twin-roll continuous casting and rolling method or a Properzi continuous casting and rolling method.

Effects of the Embodiment

The dilute copper alloy material of the present embodiment allows welding without generating blow holes during TIG welding similarly to TIG welding using high purity copper or oxygen-free copper, and thus allows adequate welding. In addition, it is possible to suppress hydrogen embrittlement which occurs in the conventional case of using TPC.

Table 1 shows experimental conditions and results.

TABLE 1

| Experimental material | Oxygen concentration (mass ppm) | S concentration (mass ppm) | Ti concentration (mass ppm) | 2.6 mm diameter semi-softening temperature (° C.) | 2.6 mm diameter conductivity of soft material (% IACS) | Evaluation of dispersed particle size | Overall evaluation |
|---|---|---|---|---|---|---|---|
| Comparative Example 1 (small continuous casting machine) | 1 to less than 2 | 5 | 0 | 215 X | 101.7 | ○ | X |
| | 1 to less than 2 | 5 | 7 | 168 X | 101.5 | ○ | X |
| | 1 to less than 2 | 5 | 13 | 160 X | 100.9 | ○ | X |
| | 1 to less than 2 | 5 | 15 | 173 X | 100.5 | ○ | X |
| | 1 to less than 2 | 5 | 18 | 190 X | 99.6 | ○ | X |
| Comparative Example 2 (SCR) | 7 to 8 | 3 | 0 | 164 X | 102.2 | ○ | X |
| | 7 to 8 | 5 | 2 | 157 X | 102.1 | ○ | X |
| Example 1 (SCR) | 7 to 8 | 5 | 4 | 148 ○ | 102.1 | ○ | ○ |
| | 7 to 8 | 5 | 10 | 135 ○ | 102.2 | ○ | ○ |
| | 7 to 8 | 5 | 13 | 134 ○ | 102.4 | ○ | ○ |
| | 7 to 8 | 5 | 20 | 130 ○ | 102.2 | ○ | ○ |
| | 7 to 8 | 5 | 25 | 132 ○ | 102.0 | ○ | ○ |
| | 7 to 8 | 5 | 37 | 134 ○ | 101.1 | ○ | ○ |
| | 7 to 8 | 5 | 40 | 135 ○ | 99.6 | ○ | ○ |
| | 7 to 8 | 5 | 55 | 148 ○ | 98.2 | ○ | ○ |
| Comparative Example 3 (SCR) | 7 to 8 | 5 | 60 | 155 X | 97.7 | X poor surface quality | X |
| Example 2 (SCR) | difficult to control stability at less than 2 | 5 | 13 | 145 ○ | 102.1 | ○ | Δ |
| | more than 2 but not more than 3 | 5 | 11 | 133 ○ | 102.2 | ○ | ○ |
| | 3 | 5 | 12 | 133 ○ | 102.2 | ○ | ○ |
| | 30 | 5 | 10 | 134 ○ | 102.0 | ○ | ○ |
| Comparative Example 4 (SCR) | 40 | 5 | 14 | 134 ○ | 101.8 | X poor surface quality | X |
| Example 3 (SCR) | 7 to 8 | 2 | 4 | 134 ○ | 102.2 | ○ | ○ |
| | 7 to 8 | 10 | 13 | 135 ○ | 102.3 | ○ | ○ |
| | 7 to 8 | 12 | 14 | 136 ○ | 102.2 | ○ | ○ |
| | 7 to 8 | 11 | 19 | 133 ○ | 102.4 | ○ | ○ |
| | 7 to 8 | 12 | 20 | 133 ○ | 102.4 | ○ | ○ |
| Comparative Example 5 | 7 to 8 | 18 | 13 | 162 X | 101.5 | ○ | X |
| Comparative Example 6 (Cu (6N)) | | | | 127 to 130 ○ | 102.8 | none | — |

Firstly, an 8 mm diameter copper wire (a wire rod, at a working ratio of 99.3%) having concentrations of oxygen, sulfur and titanium shown in Table 1 was made as an experimental material. The 8 mm diameter copper wire has been hot rolled by SCR continuous casting and rolling. Copper molten metal which was molten in a shaft furnace was poured into a ladle under a reductive gas atmosphere, the molten copper poured into the ladle was introduced into a casting pot under the same reductive gas atmosphere, and after Ti was added in the casting pot, the resulting molten copper was introduced through a nozzle into a casting mold formed between a casting wheel and an endless belt, thereby making an ingot rod. The 8 mm diameter copper wire was made by hot rolling the ingot rod. Next, each experimental material was cold-drawn. As a result, a copper wire having a diameter of 2.6 mm was made. Then, the semi-softening temperature and the conductivity of the 2.6 mm diameter copper wire were measured, and the dispersed particle size in the 8 mm diameter copper wire was evaluated.

The oxygen concentration was measured by an oxygen analyzer (Leco oxygen analyzer (Leco: registered trademark)). Each concentration of sulfur and titanium was analyzed by an IPC emission spectrophotometer.

After holding for one hour at each temperature of not more than 400° C., water quenching and a tensile test were carried out, and the measurement result of the semi-softening temperature of 2.6 mm diameter wire was obtained. It was obtained by using the result of the tensile test at a room temperature and the result of the tensile test of the soft copper wire which was heat-treated in an oil bath at 400° C. for one hour, and the temperature corresponding to a strength value calculated by adding the two tensile strength results in the tensile test and then dividing by two was defined as a semi-softening temperature.

As described for the embodiment, it is preferable that the dispersed particles in the dilute copper alloy material be small in size and large in number. Therefore, it is judged as "Passed" when not less than 90% of dispersed particles have a diameter of not more than 500 nm. "Size", as described here, is a size of a compound and means a size of a long diameter of the compound in a shape having long and short diameters. Meanwhile, "particle" indicates TiO, $TiO_2$, TiS and Ti—O—S. In addition, "90%" indicates a ratio of the number of such particles to the total number of particles.

In Table 1, Comparative Example 1 is a copper wire having a diameter of 8 mm which was experimentally formed under Ar atmosphere in the experimental laboratory and in which 0 to 18 mass ppm of Ti was added to the copper molten metal. In contrast to the case that the semi-softening temperature of the copper wire without addition of Ti thereto is 215° C., the semi-softening temperature of the copper wire with 13 mass ppm of Ti added thereto was lowered to 160° C. (the minimum temperature in the tests in Comparative Example 1). As shown in Table 1, the semi-softening temperature was increased with increasing the Ti concentration from 15 to 18 mass ppm, and it was not possible to realize the required semi-softening temperature of not less than 148° C. In addition, although the conductivity was not less than 98% IACS which satisfies the industrial demand, the overall evaluation was "Failed" (hereinafter, "Failed" is indicated by "X").

Then, as Comparative Example 2, the oxygen concentration was adjusted to 7 to 8 mass ppm and an 8 mm diameter copper wire (wire rod) was experimentally formed using the SCR continuous casting and rolling method.

Among the copper wires experimentally formed using the SCR continuous casting and rolling method, the copper wire of Comparative Example 2 has the minimum Ti concentration (i.e., 0 mass ppm and 2 mass ppm) and the conductivity was not less than 102% IACS. However, the semi-softening temperature is 164° C. and 157° C. which is not the demanded temperature of not more than 148° C., hence, the overall evaluation is "X".

In Example 1, copper wires having substantially the same concentrations of oxygen and sulfur (i.e., the oxygen concentration of 7 to 8 mass ppm and the sulfur concentration of 5 mass ppm) but having a Ti concentration differed within a range of 4 to 55 mass ppm were experimentally formed.

The Ti concentration in the range of 4 to 55 mass ppm is satisfactory because the softening temperature is not more than 148° C., the conductivity is not less than 98% IACS or not less than 102% IACS and the dispersed particle size is not more than 500 nm in not less than 90% of particles. In addition, since the surface of the wire rod is also fine and all materials satisfy the product performances thereof, the overall evaluation is "Passed" (hereinafter, "Passed" is indicated by "○").

Here, the copper wire which satisfies the conductivity of not less than 100% IACS has the Ti concentration of 4 to 37 mass ppm and the copper wire which satisfies not less than 102% IACS has the Ti concentration of 4 to 25 mass ppm. The conductivity of 102.4% IACS which is the maximum value was exhibited when the Ti concentration is 13 mass ppm, and the conductivity at around this concentration was a slightly lower value. This is because, when the Ti concentration is 13 mass ppm, sulfur in copper is trapped as a compound, and thus, the conductivity close to that of high purity copper (6N) is exhibited.

Therefore, it is possible to satisfy both of the semi-softening temperature and the conductivity by increasing the oxygen concentration and adding Ti.

In Comparative Example 3, a copper wire in which the Ti concentration is increased to 60 mass ppm was experimentally formed. The copper wire in Comparative Example 3 satisfies the demanded conductivity, however, the semi-softening temperature is not less than 148° C., which does not satisfy the product performance. Furthermore, there were many surface flaws on the wire rod, hence, it was difficult to treat as a commercial product. Therefore, it was shown that the preferable added amount of Ti is less than 60 mass ppm.

Regarding the copper wire of Example 2, the sulfur concentration was set to 5 mass ppm and the Ti concentration was controlled to within a range of 13 to 10 mass ppm, and the affect of the oxygen concentration was examined by changing the oxygen concentration.

Copper wires having largely different oxygen concentrations within a range from more than 2 mass ppm to not more than 30 mass ppm were made. However, since the copper wire having the oxygen concentration of less than 2 mass ppm is difficult to produce and cannot be stably manufactured, the overall evaluation is Δ (not good). (Note that, "Δ" is between "○" and "X" as an evaluation.) In addition, the requirements of both the semi-softening temperature and the conductivity are satisfied even when the oxygen concentration is increased to 30 mass ppm.

In Comparative Example 4, When the oxygen concentration was 40 mass ppm, there were many flaws on the surface of the wire rod and it was in a condition which cannot be a commercial product.

Therefore, it was shown that, by adjusting the oxygen concentration so as to fall within a range of more than 2 but not more than 30 mass ppm, it is possible to satisfy all characteristics of the semi-softening temperature, conductivity of not less than 102% IACS and the dispersed particle size, and in addition, the surface of the wire rod is fine and the product performance can be satisfied.

Example 3 is a copper wire in which the oxygen concentration is relatively close to the Ti concentration and the sulfur concentration is changed in a range from 2 to 12 mass ppm. In Example 3, it was not possible to realize a copper wire having the sulfur concentration of less than 2 mass ppm due to limitation of raw material. However, it is possible to satisfy the requirements of both the semi-softening temperature and the conductivity by respectively controlling the concentrations of Ti and sulfur.

Comparative Example 5, in which the sulfur concentration is 18 mass ppm and the Ti concentration is 13 mass ppm, has a high semi-softening temperature of 162° C. and could not satisfy requisite characteristics. In addition, the surface quality of the wire rod is specifically poor, and it was thus difficult to commercialize.

As described above, it was shown that all characteristics which are the semi-softening temperature, not less than 102% IACS of conductivity and the dispersed particle size can be satisfied when the sulfur concentration is 2 to 12 mass ppm, the surface of the wire rod is also fine and all product performances can be satisfied.

Comparative Example 6 is a copper wire using 6N copper. In the copper wire of Comparative Example 6, the semi-softening temperature was 127 to 130° C., the conductivity was 102.8% IACS and particles having not more than 500 nm in the dispersed particle size were not observed at all.

Table 2 shows a molten copper temperature and a rolling temperature as the manufacturing conditions.

1350° C. and the rolling temperature to within 880 to 550° C. In the wire rod in Comparative Example 10, the large dispersed particles are included since the molten copper temperature is high, and the overall evaluation is "X".

Here, a material shown in the third row of Example 1 in Table 1 is examined. A 2.6 mm-diameter wire was formed from this material in the same manner as the above and the wire was processed from 2.6 mm diameter into a flat wire in size of height 1.4 mm×width 2.2 mm by passing through a wire drawing die. Then, enamel was applied to and baked on the flat wire, thereby making an enameled wire.

This enameled wire can be used for a coil of a motor for vehicle or a coil of an alternator, etc. When used as a coil, the TIG welding between the coil and a power supply terminal is required in order to supply power to the coil. Although the enameled wire is selected as a specimen here to verify TIG

TABLE 2

| Experimental material | Molten copper temperature (° C.) | Oxygen concentration (mass ppm) | S concentration (mass ppm) | Ti concentration (mass ppm) | Hot-rolling temperature (° C.) initial-final | 2.6 mm diameter semi-softening temperature (° C.) | 2.6 mm diameter conductivity of soft material (% IACS) | WR surface quality | Evaluation of dispersed particle size | Overall evaluation |
|---|---|---|---|---|---|---|---|---|---|---|
| Comparative Example 7 | 1350 | 15 | 7 | 13 | 950-600 | 148 | 101.7 | X | X | X |
|  | 1330 | 16 | 6 | 11 | 950-600 | 147 | 101.2 | X | X | X |
| Example 4 | 1320 | 15 | 5 | 13 | 880-550 | 143 | 102.1 | ○ | ○ | ○ |
|  | 1300 | 16 | 6 | 13 | 880-550 | 141 | 102.3 | ○ | ○ | ○ |
|  | 1250 | 15 | 6 | 14 | 880-550 | 138 | 102.1 | ○ | ○ | ○ |
|  | 1200 | 15 | 6 | 14 | 880-550 | 135 | 102.1 | ○ | ○ | ○ |
| Comparative Example 8 | 1100 | 12 | 5 | 12 | 880-550 | 135 | 102.1 | X | ○ | X |
| Comparative Example 9 | 1300 | 13 | 6 | 13 | 950-600 | 147 | 101.5 | ○ | X | X |
| Comparative Example 10 | 1350 | 14 | 6 | 12 | 880-550 | 149 | 101.5 | X | X | X |

In Comparative Example 7, an 8 mm diameter wire rod was made at the molten copper temperature of 1330 to 1350° C. and at the rolling temperature of 950 to 600° C. Although the wire rod in Comparative Example 7 satisfies the requirements of the semi-softening temperature and the conductivity, there are particles having a dispersed particle size of about 1000 nm and the presence of particles having a particle size of not less than 500 nm was more than 10%. Therefore, the wire rod in Comparative Example 7 was judged as inapplicable.

In Example 4, an 8 mm diameter wire rod was made by controlling the molten copper temperature to within 1200 to 1320° C. and the rolling temperature to within 880 to 550° C. The wire rod in Example 4 was satisfactory in the surface quality and the dispersed particle size, and the overall evaluation was "○".

In Comparative Example 8, an 8 mm diameter wire rod was made by controlling the molten copper temperature to 1100° C. and the rolling temperature to within 880 to 550° C. The wire rod in Comparative Example 8 was not suitable as a commercial product since there were many surface flaws thereon due to the low molten copper temperature. This is because the flaws are likely to be generated at the time of rolling since the molten copper temperature is low.

In Comparative Example 9, an 8 mm diameter wire rod was made by controlling the molten copper temperature to 1300° C. and the rolling temperature to within 950 to 600° C. The wire rod in Comparative Example 9 has satisfactory surface quality since the temperature during the hot rolling process is high, however, the dispersed particles large in size are included and the overall evaluation is "X".

In Comparative Example 10, an 8 mm diameter wire rod was made by controlling the molten copper temperature to weldability, the application of the present example is not limited to the enameled wire. It is possible to use the material of the present example for other applications which require the TIG weldability. In addition, "welding" is not limited to the TIG welding as long as it is a method of welding by melting at a high temperature. It is possible to use, e.g., arc welding or laser welding, etc.

Table 3 shows evaluations of blow hole and of weld strength and overall evaluation (indicated as "Evaluation" in Table 3) of the material in Example 5, etc.

TABLE 3

|  | Blow hole | Weld strength | Evaluation |
|---|---|---|---|
| Example 5 | ○ | ○ | ○ |
| OFC (Comparative Example 1) 1 ppm | ○ | ○ | ○ |
| 6N Copper (Comparative Example 12) | ○ | ○ | ○ |
| TPC (Comparative Example 13) | X | X | X |

Here, in a blow hole test, an end of a 2.6 mm-diameter single wire was melted by discharging an arc thereto (welding conditions: 100 A, 100 ms, argon gas flow rate of 10 L/min), the single wire was longitudinally cut, a cut surface of the end thereof was checked and the presence of blow holes was evaluated. In Table 3, the specimen with blow holes is indicated by "X" and those without blow holes are indicated by "○".

In a weld strength test, two specimens were arranged in parallel and were arc-welded at the ends thereof (welding conditions: 200 A, 250 ms, argon gas flow rate of 10 L/min), and then, strength when separating the specimens was measured. Strength of a base material was specified by a tensile test. In Table 3, the specimens exhibiting strength which is not less than 90% of that of the base material are indicated by "◯" and the specimen exhibiting strength which is less than 90% of that of the base material is indicated by "X".

The material in Example 5 includes 15 mass ppm of oxygen. Since the oxygen in the material forms a compound with Ti and is not released even in the arc atmosphere during TIG welding, hydrogen is not reacted with oxygen and steam is not produced. Therefore, blow holes are not formed in Example 5. As a result, weld strength is not degraded in Example 5.

In addition, blow holes are hardly formed in Comparative Examples 11 and 12 since the oxygen concentration in the material is originally low. Therefore, weld strength is not degraded in Comparative Examples 11 and 12, neither.

On the other hand, the material in Comparative Example 13 includes about 350 mass ppm of oxygen. The oxygen is included in the formed of $Cu_2O$ in the material. Then, oxygen (O) is released in the arc atmosphere during the TIG welding and produces $H_2O$ by a reaction with hydrogen (H). The $H_2O$ is trapped in the molten copper and remains as a blow hole. Therefore, degradation of weld strength and a strength decrease due to hydrogen embrittlement occur in Comparative Example 13.

Figure 11:
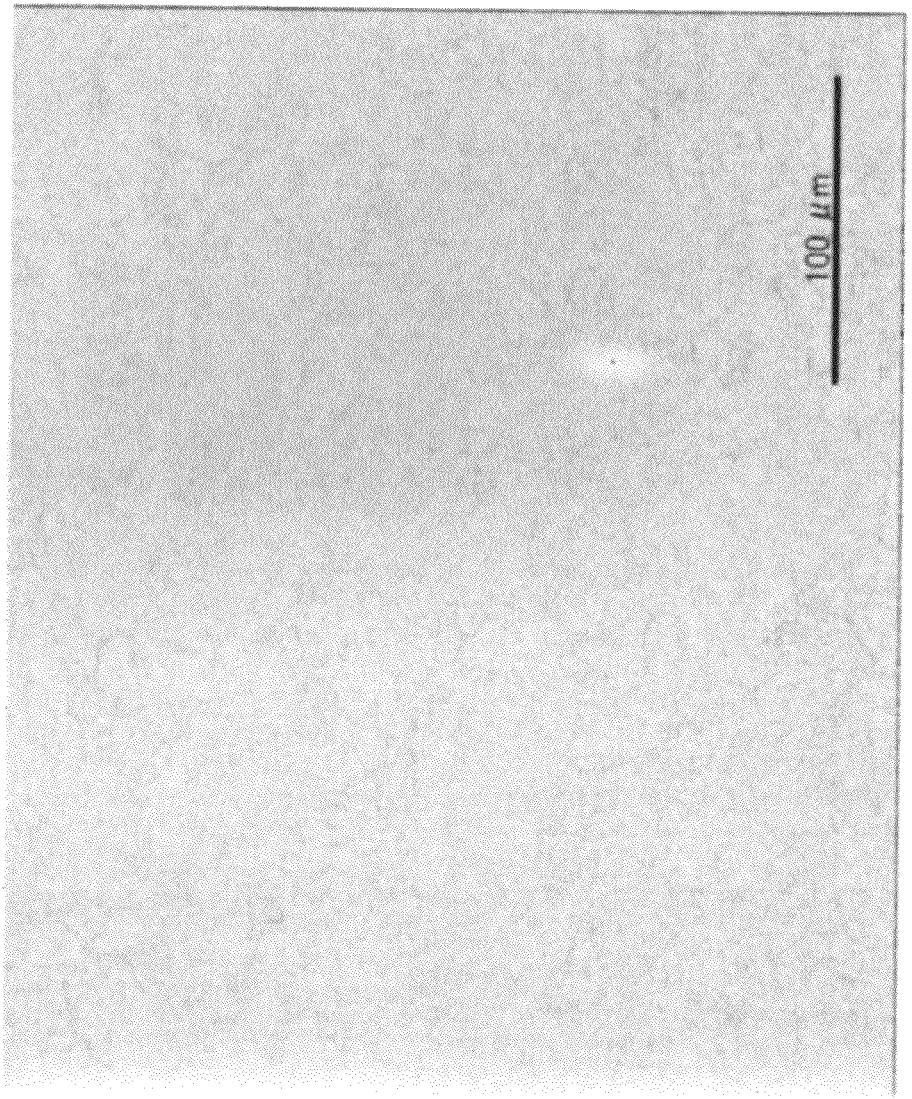
FIG. 11 is a longitudinal cross sectional view showing a TIG welded joint in Example.
Figure 12:
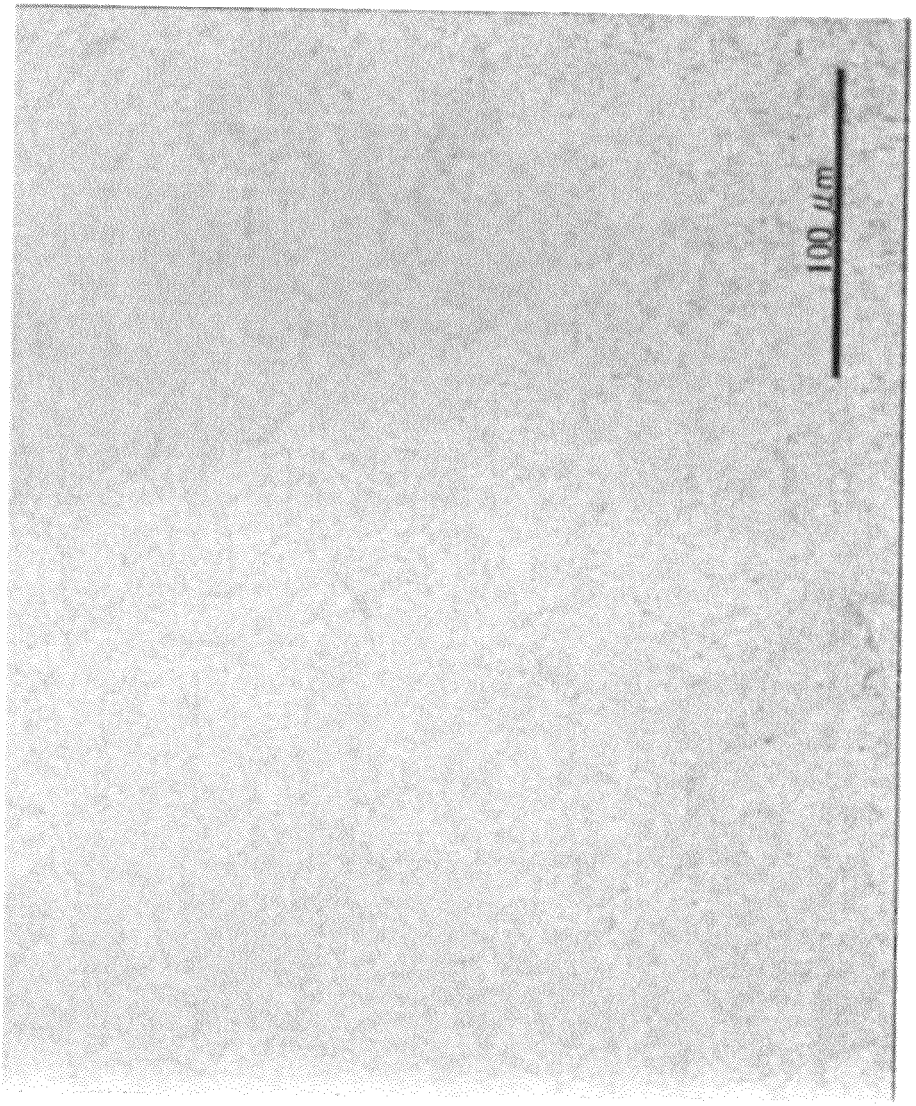
FIG. 12 is a longitudinal cross sectional view showing a TIG welded joint of oxygen-free copper (OFC)

FIG. 11 is a longitudinal cross sectional view showing a TIG welded joint in Example and FIG. 12 is a longitudinal cross sectional view showing a TIG welded joint of oxygen-free copper (OFC). In addition, FIG. 13 is a longitudinal cross sectional view showing a TIG welded joint of tough pitch copper (TPC).

Figure 13:
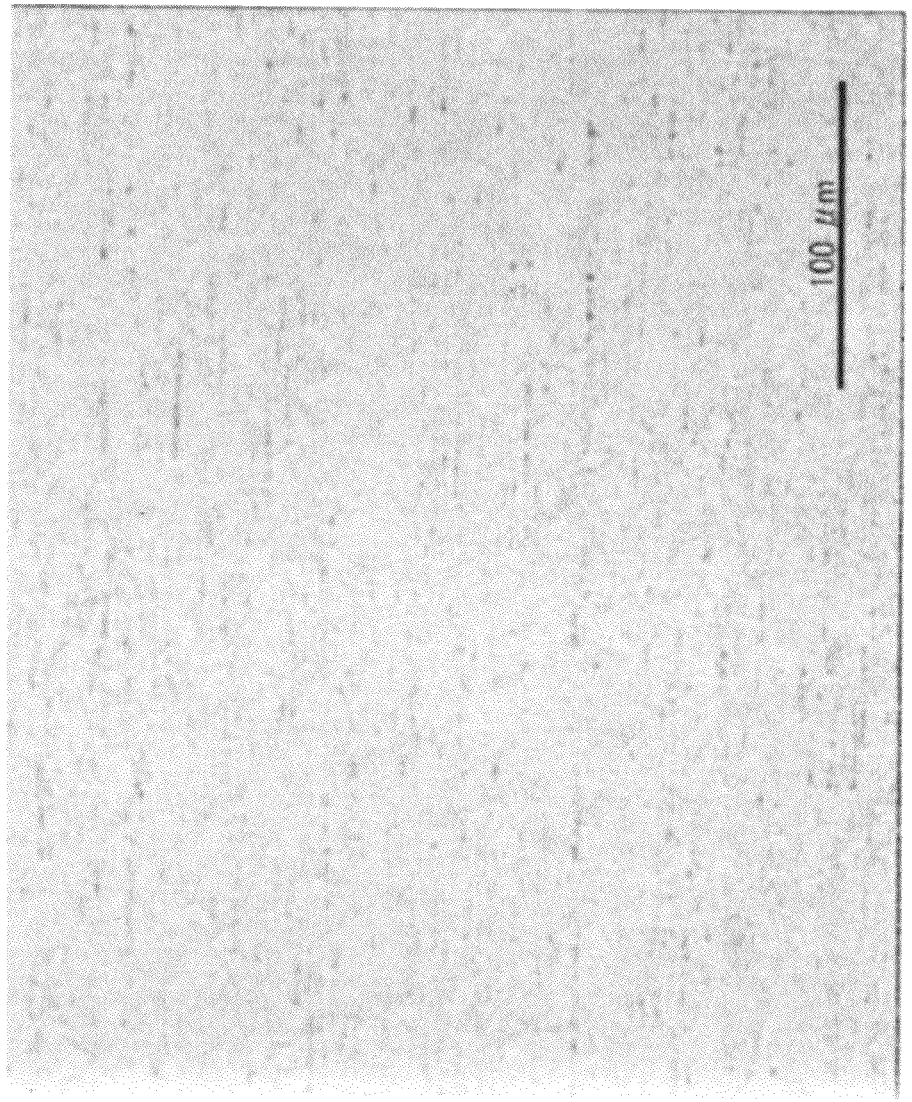
FIG. 13 is a longitudinal cross sectional view showing a TIG welded joint of tough pitch copper (TPC).

In the cross sectional image of TPC in FIG. 13, it is observed that copper oxide is diffusely distributed. On the other hand, in the cross sectional images in FIGS. 11 and 12, copper oxide is hardly observed. As a result of specifically examining Example in FIG. 11, oxide in copper was Ti oxide and copper oxide was not found.

In Examples, the TIG weldability was excellent even though some oxygen is included. It is believed that this is because copper oxide is actually not present as an oxide in copper.

Although the embodiments and examples of the invention have been described, the invention according to claims is not to be limited to the above-mentioned embodiments and examples. Further, it should be noted that not all combinations of the features described in the embodiments and examples are not necessary to solve the problem of the invention.

What is claimed is:

1. At least two different metal materials welded together, the at least two metal materials comprising:
    a first material comprising a welded portion and a non-welded portion; and
    a second material comprising another welded portion and another non-welded portion including purified copper having a level of 4N or more purity including more than 10 mass ppm of oxygen, an additive element consisting of not less than 4 mass ppm and not more than 55 mass ppm of Ti, and an inevitable impurity including sulfur, the welded portion of the first material being welded to said another welded portion of the second material,
    wherein the Ti in a form of TiO of not more than 200 nm in size, $TiO_2$ of not more than 1000 nm in size, TiS of not more than 200 rim in size, and Ti—O—S of not more than 300 nm in size is included in a crystal grain.

2. The least two metal materials according to claim 1, wherein the at least two different metal materials are welded to each other by Tungsten Inert Gas (TIG) welding.

3. At least two metal materials welded to each other to form a weldment, each of the at least two metal materials comprising:
    purified copper including a level of 4N or more purity including more than 10 mass ppm of oxygen, an additive element consisting of not less than 4 mass ppm and not more than 55 mass ppm of Ti, and an inevitable impurity including sulfur,
    wherein said each of the at least two metal materials is welded to the other to form the weldment by Tungsten Inert Gas (TIG) welding,
    wherein no blow hole is formed in the weldment, and
    wherein the Ti in a form of TiO, $TiO_2$, TiS, and Ti—O—S is included in a crystal grain.

* * * * *